(12) United States Patent
Honick et al.

(10) Patent No.: US 6,320,945 B1
(45) Date of Patent: Nov. 20, 2001

(54) LINE-POWERED PAY TELEPHONE

(76) Inventors: Ronald J. Honick, 2208 Tree Corners Pkwy.; Richard A. Padula, 5064 Beverly Glen La., Apt. I, both of Norcross, GA (US) 30092

( * ) Notice: Subject to any disclaimer, the term of this patent is extended or adjusted under 35 U.S.C. 154(b) by 0 days.

(21) Appl. No.: 08/869,707

(22) Filed: Jun. 5, 1997

(51) Int. Cl.[7] .................................................. H04M 17/00
(52) U.S. Cl. ...................... 379/143; 379/146; 379/395.01
(58) Field of Search .................................... 379/143, 145, 379/146, 153, 155, 147, 148, 149, 150, 151, 152, 154, 395.01

(56) References Cited

U.S. PATENT DOCUMENTS

| | | |
|---|---|---|
| 4,759,054 | 7/1988 | Mellon . |
| 4,860,346 | 8/1989 | Mellon . |
| 4,926,458 | 5/1990 | Reger et al. . |
| 4,942,604 * | 7/1990 | Smith et al. ........................... 379/412 |
| 4,979,208 * | 12/1990 | Prudent et al. ....................... 379/145 |
| 5,133,005 * | 7/1992 | Kelley et al. ......................... 379/146 |
| 5,297,148 | 3/1994 | Harari et al. . |
| 5,311,582 * | 5/1994 | Daveport et al. .................... 379/143 |
| 5,319,702 * | 6/1994 | Kitchin et al. ....................... 379/145 |
| 5,319,802 * | 6/1994 | Kitchin et al. ....................... 379/189 |
| 5,345,424 | 9/1994 | Landgraf . |
| 5,410,590 * | 4/1995 | Blood et al. ......................... 379/147 |
| 5,420,915 * | 5/1995 | Garrett ................................. 379/143 |
| 5,428,579 | 6/1995 | Robinson et al. . |
| 5,542,077 | 7/1996 | Johnson et al. . |
| 5,554,553 | 9/1996 | Harari . |
| 5,574,684 | 11/1996 | Tomoeda . |
| 5,907,606 * | 5/1999 | Ingalsbe et al. ..................... 379/146 |

FOREIGN PATENT DOCUMENTS

| | | | | |
|---|---|---|---|---|
| 0343996 A2 | * | 11/1989 | (EP) | ............................. H04M/17/02 |
| WO 96/26594 | * | 8/1996 | (EP) | ............................. H04M/17/02 |

* cited by examiner

Primary Examiner—Binh Tieu

(57) ABSTRACT

A pay telephone unit is disclosed that derives all operating power from the tip and ring conductors of the telephone line without the need for a battery. All data is stored in nonvolatile memory requiring no power for data retention, even when disconnected from the telephone line. The unit employs an interrupt architecture that advantageously reduces current consumption in comparison with prior art polling arrangements. In addition, stored power from operational circuitry is diverted to keep the real-time clock operating during momentary disruptions in line power. Diverted power may also be used to permit certain parameter settings, when initiated by the real-time clock, to be changed while the telephone unit is in an on-hook condition.

32 Claims, 6 Drawing Sheets

LINE-POWERED PAY TELEPHONE

BACKGROUND OF THE INVENTION

The present invention relates generally to a pay telephone unit that derives its operating power solely from the telephone line, without a source of external power. More particularly, the invention relates to a line-powered pay telephone unit that does not require a battery to provide power during an on-hook or off-hook condition.

At one time, all pay telephones were essentially "dumb" boxes consisting of a keypad (or rotary dialer in much earlier phones), handset and coin mechanism. All "intelligence" (previously human operators) resided in expensive equipment located in the telephone company's Central Office (CO). This equipment would sense when a call was being initiated, determine the cost, inform the user of the amount to be deposited, count the deposited coins, determine when a connection had been made, time the call, ask for additional coinage if required, and deposit or refund the coinage as necessary. Disposition of the coinage would depend on whether a valid call resulted or, for example, a busy signal was received or the phone was returned on-hook prior to a connection being established. Operation of the telephone's coin mechanism was controlled from the CO.

With the advent of Customer Owned Coin Operated Telephones (COCOT), all of the functions and decisions that had previously been handled by the CO equipment now had to be accomplished in the phone itself. Advanced electronics made this possible and the "smart phone" came into being. Unlike the common phone found in most homes and businesses, smart phones contain an extensive amount of electronics, essentially a small computer, that needs to be powered.

Until recently, smart phones derived their operating power from conventional AC wiring. The need for AC power, however, has often been a source of significant inconvenience and expense for the owner. The telephone line is supplied to the phone by the telephone company, but AC has to be run separately, often through underground conduit. A licensed electrician is frequently needed for installation of the AC wiring and additional electric metering is sometimes required. In such installations, power may be inadvertently switched off at night or on weekends.

New phones, powered from the telephone line itself, have begun to appear on the market in the last several years. These phones were developed to eliminate the disadvantages of being AC powered. Since only a minuscule amount of power can be drawn from the telephone line in an on-hook condition, rechargeable batteries are often utilized in "line-powered" telephones to supply the additional power required during this time. Depending on the phone's design, battery power may be necessary for data retention, real-time clock operation, and controlling coin and switching relays.

It will be appreciated that the use of batteries gives rise to a number of disadvantages. For example, battery failure or a momentary glitch in power will cause data stored in RAM memory to be erased or corrupted. In addition, the process of battery replacement is often time consuming, costly or otherwise problematic.

One smart phone design powered solely from telephone line power is described in U.S. Pat. No. 5,133,005 to Kelley et al., incorporated herein by reference. This patent teaches that the power provided by the telephone line is not sufficient while on-hook to maintain computer memory or to power-up the phone to initiate calls during alarm conditions. A battery, with its attendant disadvantages, provides the additional power required during the on-hook condition. When the phone is off-hook, the battery is recharged using "excess loop current," i.e., the difference between the current required for use of the phone and the current supplied by the telephone line. In some situations, however, no excess loop current may be available to recharge the battery. It will be appreciated that such a design may encounter operational difficulties if the battery becomes insufficiently charged.

SUMMARY OF THE INVENTION

The present invention recognizes and addresses various disadvantages of prior art constructions and methods. Accordingly, it is an object of the present invention to provide an improved pay telephone unit.

It is a particular object of the present invention to provide an improved pay telephone unit that derives operating power from the telephone line.

It is a more particular object of the present invention to provide a line powered pay telephone unit that does not require battery power during an on-hook or off-hook condition.

It is another object of the present invention to provide a line powered pay telephone employing a nonvolatile memory for data retention.

It is a further object of the invention to provide a line powered pay telephone that can power-up during an on-hook condition while presenting a predetermined high resistance to the telephone line.

It is a still further object of the present invention to provide a line powered pay telephone having a real time clock device that will continue operating for a predetermined amount of time during interruptions in line power.

It is an additional object of the present invention to provide a line powered pay telephone unit having various advantageous features in comparison with line powered pay telephones of the prior art.

Some of these objects are achieved by a pay telephone unit for connection to a telephone line. The telephone unit includes a microprocessor having a nonvolatile memory device associated therewith. The memory device has stored therein at least program code and rate information. Power control circuitry is operative to initiate power up of the microprocessor responsive to predetermined inputs. Power routing circuitry, operatively associated with the power control circuit, directs power from the telephone line to the microprocessor only in response to the predetermined inputs.

In presently preferred embodiments, the nonvolatile memory device is a flash memory unit which may be mounted directly to a printed circuit board. Often, the microprocessor will also write usage records to the flash memory unit for storage therein. The flash memory unit may further store compressed speech information operatively decoded by a speech decode algorithm implemented by the microprocessor.

The pay telephone unit may preferably include a real time clock device. In this case, the power routing circuitry is further operative to direct power from the telephone line to the real time clock device irrespective of the predetermined inputs. Preferably, the microprocessor will be operative to interrogate the real time clock device after power up to determine if an intervening data corruption has occurred.

In some exemplary embodiments, the power routing circuitry further comprises a passive energy storage element operative to maintain operation of the real time clock device for a predetermined period of time during interruptions in power from the telephone line. A passive energy storage element may also be utilized to power up the microprocessor responsive to an alarm indicator from the real time device when in an on-hook condition. In such embodiments, the passive energy storage element may be a capacitive element associated with a coin relay.

The power routing circuitry may further include at least one resistive element to present a predetermined higher resistance to the telephone line in an on-hook condition than an off-hook condition. In presently preferred embodiments, the predetermined higher resistance may be at least five megohms.

In some exemplary embodiments, the power control circuitry may include a first buffer operative to store data indicative of the predetermined inputs for communication with the microprocessor. The power control circuitry may further include coin present circuitry operative to indicate to the microprocessor deposition of coinage occurring prior to power up.

Function control circuitry may also be provided to inform the microprocessor of predetermined functions. The function control circuitry will generally have a second buffer to store data indicative of the predetermined functions for communication with microprocessor.

Other objects of the invention are provided by a pay telephone unit comprising a microprocessor, a flash memory device associated with the microprocessor, and a real time clock device. Power control circuitry is operative to initiate power up of the microprocessor responsive to at least a hookswitch mechanism indicating an off-hook condition. Power routing circuitry, operatively associated with the control circuitry, directs power from the telephone line to the microprocessor in response to the off-hook condition. The power routing circuitry is further operative to direct power from the telephone line to the real time clock device irrespective of the off-hook condition.

In some exemplary embodiments, the power routing circuitry further comprises a capacitive element operative to power up the microprocessor responsive to an alarm indicator from the real time clock device when in an on-hook condition. The power routing circuitry may further comprise a capacitive element operative to maintain operation of the real time clock device for a predetermined period of time during interruptions in power from the telephone line.

The power routing circuitry may also include at least one resistive element to present a predetermined resistance to the telephone line when in an on-hook condition. For example, the predetermined resistance may be at least five megohms.

Preferably, the microprocessor may also write usage records to the flash memory device for storage therein. In such embodiments, the microprocessor will preferably be in one of a no power condition, low power condition or full power condition at predetermined times.

Still further objects of the invention are achieved by a pay telephone unit operative to derive all of its operating power from a telephone line without the use of batteries. The telephone unit comprises a microprocessor, a real time clock device, and a flash memory device associated with the microprocessor. The flash memory device stores therein program code, rate information and usage records.

The pay telephone unit further includes power control circuitry operative to initiate power up of the microprocessor responsive to predetermined inputs. Power routing circuitry, operatively associated with the power control circuitry, directs power from the telephone line to the microprocessor only in response to the predetermined inputs. The power routing circuitry is further operative to direct power from the telephone line to the real time clock device irrespective of the predetermined inputs.

In some exemplary embodiments, the power routing circuitry presents a resistance of at least five megohms to the telephone line in an on-hook condition. The power routing circuitry may further comprise a passive energy storage element operative to provide a reservoir of energy usable during predetermined situations while in an on-hook condition. The passive energy storage element may be a capacitive element associated with a coin relay.

The power control circuitry may further include a first buffer operative to store data indicative of the predetermined inputs. In this case, the microprocessor is operative to communicate with the first buffer. In addition, the power control circuitry may include coin present circuitry operative to indicate to the microprocessor deposition of coinage during an on-hook condition. Function control circuitry may also be provided, operative to inform the microprocessor of predetermined functions. The function control circuitry includes a second buffer in operative communication with the microprocessor to store data indicative thereof.

In some exemplary embodiments, the flash memory device may be configured for on-board programming. A modem device may also be provided, operative to effect electronic communication with the microprocessor via the telephone line. In another aspect, the pay telephone unit may further comprise a light-emitting diode operative to give a visual indication of an off-hook condition. Moreover, the microprocessor may be configured to perform digital highpass and lowpass filtering of received audio signals.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
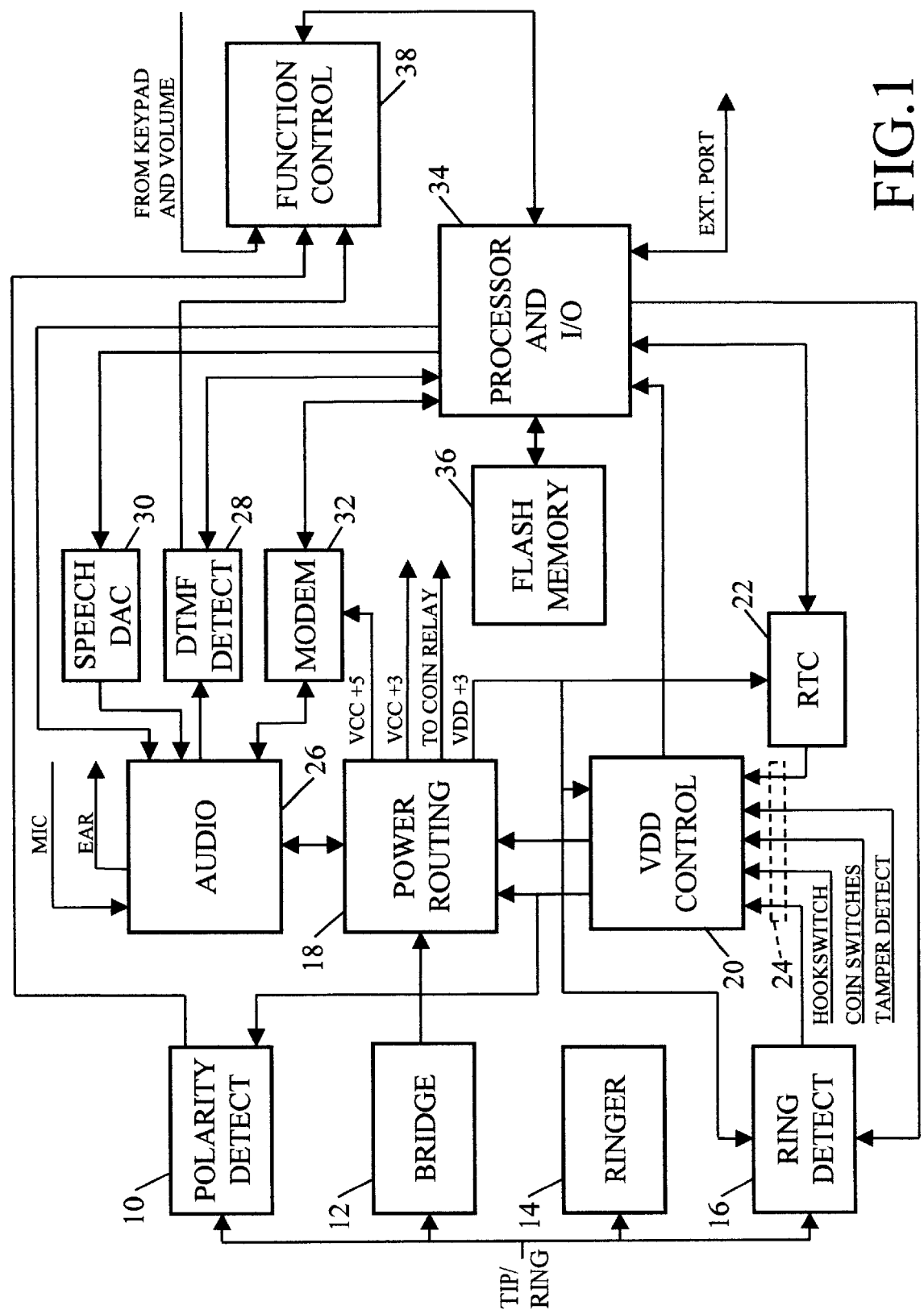
FIG. 1 is a diagrammatic representation of a pay telephone unit constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

As noted above, exemplary telephone units of the present invention derive all operating power from the telephone line, without the use of additional external power or supplemental battery power. Because minimal current may be drawn from the telephone line in an on-hook condition, the telephone unit preferably employs an architecture that uses very little power in this situation. When an off-hook or other appropriate situation is detected, the remainder of the unit is allowed to power-up. Even during power-up, however, the unit is preferably designed to minimize electrical activity.

FIG. 1 diagrammatically illustrates an improved line-powered pay telephone unit constructed in accordance with the present invention. As shown, the telephone unit includes a polarity detector 10, bridge circuit 12, ringer 14 and ring detector 16 connected directly across the tip and ring conductors of the telephone line. The manner in which each of these components operates is well known to those skilled in the art.

Power from the telephone line is passed through bridge circuit 12 to power routing circuitry 18. Power routing circuitry 18 supplies regulated voltage at several different levels to the various other board components as needed. In an on-hook condition, high-impedance power is supplied to ring detector 16, VDD control 20 and real-time clock (RTC) 22. Operation of power routing circuitry 18 is in turn directed by VDD control 20, which allows power to other components when an off-hook or other power-up condition has been detected.

VDD control 20 receives a plurality of inputs, collectively referenced at 24, indicating that power-up should occur. As shown, VDD control 20 receives such inputs from ring detector 16 and RTC 22. Inputs are also provided, however, by the hookswitch, coin switches and tamper detect switch.

Audio circuitry 26 is also connected to power routing circuitry 18 to properly channel audio signals. Toward this end, audio circuitry 26 will typically include a processor-controlled switching multiplexer, as well as amplification circuitry. As shown, audio circuitry 26 receives an input from the microphone and provides an output to the earpiece located in the telephone handset. Audio circuitry 26 also directs an output to DTMF detector 28, and may receive an input from speech digital-to-analog converter (DAC) 30. In addition, a modem 32 is in electrical communication with audio circuitry 26 to modulate and demodulate electronic transmissions.

A microprocessor device, herein referenced as processor 34, resides at the functional "heart" of the telephone unit. As shown, processor 34 communicates with many of the other functional components of the telephone unit. A nonvolatile flash memory device 36 is associated with processor 34. To reduce the overall power requirements of the unit even in a power-up condition, function control circuitry 38 is also provided to send various interrupt signals to processor 34.

Figure 2:
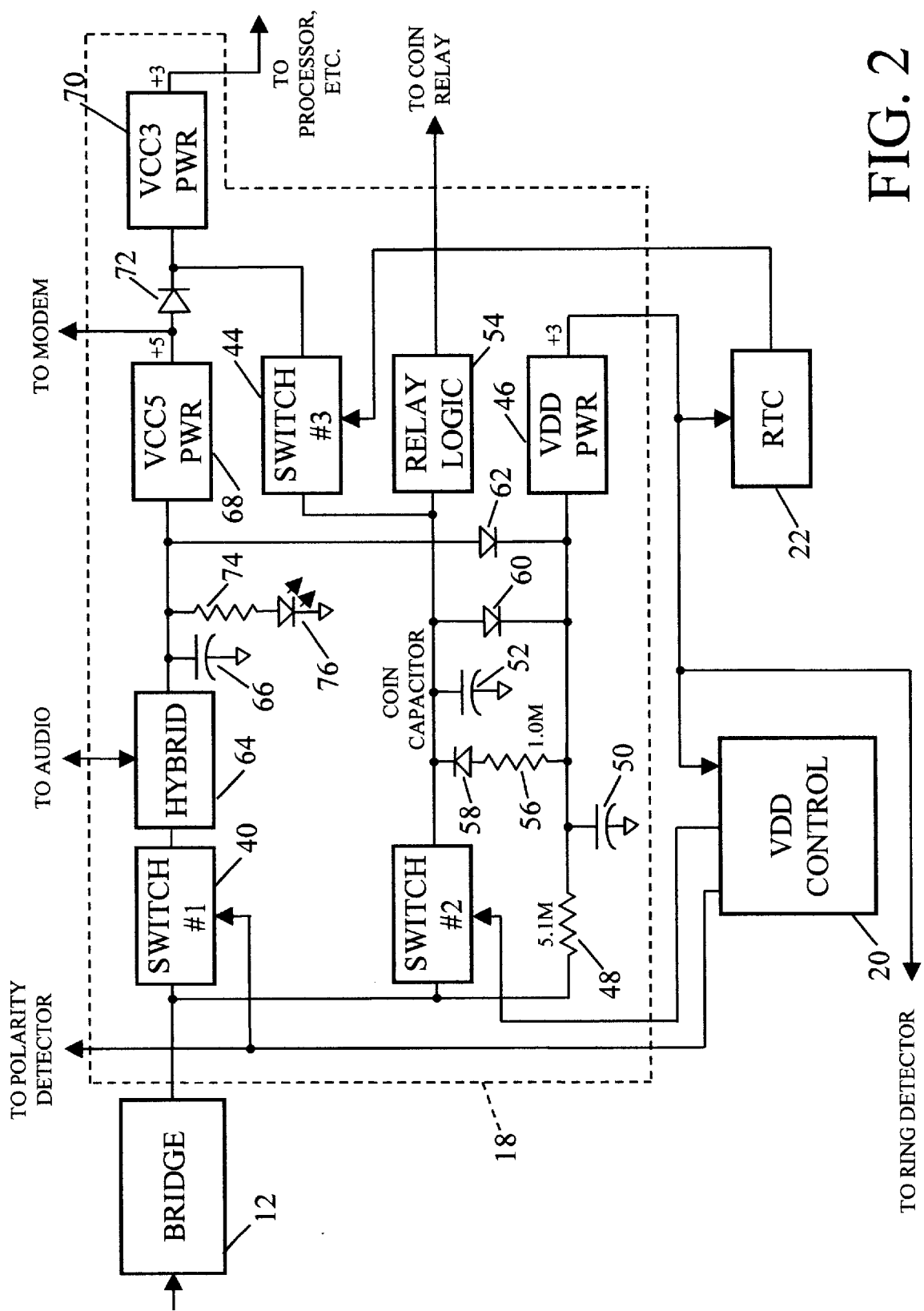
FIG. 2 is a partial diagrammatic, partial schematic representation of the power routing circuitry in the unit of FIG. 1.

Now that the overall configuration of the telephone unit has been discussed, various aspects will be described in more detail with continued reference to FIG. 1 and the remaining drawings as necessary. Thus, FIG. 2 illustrates a preferred construction of power routing circuitry 18. It can be seen that power routing circuitry 18 contains three switches 40, 42 and 44 (also referred to as Switch #1, Switch #2 and Switch #3) that are advantageously utilized to route power. As can be seen, switches 40 and 42 are directly controlled by VDD control 20. Switch 44 is likewise controlled by RTC 22. Preferably, switches 40, 42 and 44 are solid-state switches which may employ high voltage breakdown MOSFETs.

Operating voltage for continually powered components is referred as VDD, whether the telephone unit is in an on-hook or off-hook condition. In this case, the VDD is provided by +3VDC (actually 3.3V) voltage regulator indicated at 46. Preferably, regulator 46 and other regulators within power routing circuitry 18 may be standard micropower devices produced by Ricoh and other manufacturers. Because these devices generally have a maximum input rating of around 12V, an N-channel depletion-mode MOSFET having a high voltage breakdown characteristic, may be used to extend the regulator's operating range to about 500V.

In an on-hook condition, switches 40 and 42 are open such that the input to regulator 46 is supplied through resistor 48, thereby charging capacitor 50. Resistor 48 is chosen to provide a predetermined high resistance as may be required by applicable regulations. In the illustrated embodiment, for example, resistor 48 has a value of 5.1 megohms to satisfy present FCC requirements that the telephone unit present at least 5.0 megohms in an on-hook condition.

It will be appreciated that the continually powered components should be chosen to require very low operating current so that effective operation can be achieved notwithstanding high impedance requirements. HC-CMOS devices operated in the 3VDC range exhibit a very low current draw, such as about one microampere in exemplary constructions.

A coin relay capacitor 52 is initially charged by closing switch 42. Such capacitors, often conventional electrolytics, are utilized to supply operating current to the coin relay, via relay logic 54. In the present design, however, capacitor 52 is further utilized to keep the control circuitry "alive" during periods in which line power has been temporarily interrupted.

With switch 42 open, as is typical during the on-hook condition, a trickle charge is maintained on capacitor 52 through resistor 56 and diode 58. It can be seen that resistors 48 and 56 comprise a voltage divider having a ratio of approximately 5:1 if capacitor 52 is totally discharged. Assuming a nominal line voltage of about 48V in the on-hook condition, the voltage across capacitor 50 will not rise above about 8V. If the voltage across capacitor 50 drops due to a line power interruption, voltage from capacitor 52 will be presented to the input of regulator 46 through diode 60.

With a total absence of line power to the board, the charge on capacitor 52 will decay at the rate of about 3V per hour in a preferred embodiment. In this case, VDD can be maintained in regulation from one to three hours, depending upon the loop length, whether the phone has just been connected or is in use, and several other variables. In fact, however, only RTC 22 needs to be kept operating with no power to the board. Since preferred devices used for this purpose can continue to run and hold data down to about 1V, operation of RTC 22 can continue for an even longer time. For example, RTC 22 may continue to run for up to four hours in the absence of line power. It will be appreciated that most line power interruptions will be much shorter than four hours in duration.

When the telephone unit goes off-hook, VDD control 20 closes switch 40 to supply power to the unpowered components of the telephone unit. Power routing circuitry 18 thus provides a "bypass" around resistor 48 to the input of regulator 46. It will be appreciated that the nominal voltage provided across the telephone line will drop to a much lower level, often as low as 6V, in an off-hook condition. The bypass through diode 62 eliminates the voltage drop across resistor 48 that would otherwise occur.

It can be seen that the main power supply line through switch 40 includes a hybrid 64 in communication with audio circuitry 26. Hybrid 64 is preferably a known telephone line interface chip that functions to route audio signals to and from the telephone line. Voltage provided at the non-audio output of hybrid 64 is passed across a capacitor 66 for powering the remaining board components.

In the illustrated embodiment, a pair of voltage regulators 68 and 70 are provided in series (with an interconnecting diode 72) to provide respective 5VDC and 3VDC voltage levels. As shown, modem 32 is operated at the 5VDC level while most other components are operated from 3VDC.

Because of the efficiency of the design, current draw in many telephone units of the present invention may be below applicable off-hook requirements. For example, many preferred embodiments may draw only about 13 ma of current from the telephone line. In such cases, additional circuitry may be provided to raise the current consumption to about 20 ma. For example, a resistor 74 and LED 76 may be connected in series across the input of voltage regulator 68. LED 76 advantageously provides a visual indication that the telephone unit is in an off-hook condition, which may be useful during initial installation and troubleshooting. It is contemplated that this "left-over" current could also be utilized to operate accessories that may not otherwise be possible in a line-powered telephone unit.

To permit certain operating parameters (such as call-back times, number of rings before answer and ringer on/off times) to be time dependent, it is necessary to power-up processor 34, read RTC 22, and make any necessary adjustments while remaining on-hook. A programmed alarm output from RTC 22 initiates this action, which may occur once per hour in some exemplary embodiments. In particular, when the time set in the alarm register is reached, the clock's output line changes states (e.g., goes low), which causes an interrupt signal to be sent to processor 34. Since this function consumes little current and may occupy less than 30 ms, capacitor 52 may be utilized to provide the necessary power.

In particular, the alarm signal from RTC 22 causes switch 44 to close. As a result, the voltage across capacitor 52 is provided to the input of voltage regulator 70. It will be appreciated that diode 72 prevents backfeed of this power to the output of voltage regulator 68. Typically, the entire clock read and set function may deplete the charge on capacitor 52 by only around 300 millivolts. This voltage drop is usually regained over several minutes of on-hook time.

Despite being extremely reliable, the telephone line may still become defective or disconnected. Since RTC 22 is powered by the telephone line, such a problem could result in the time and date in RTC 22 becoming corrupted. To detect such a power failure, the firmware stores a predetermined pattern, such as a known 24-bit pattern, in unused memory locations within RTC 22. If the VDD power supply drops below the necessary 1V level, the 24-bit pattern is "very likely" to be corrupted along with the time and date. "Very likely" means that there is only a one in 16,777,216 chance that this will not be the case if power is interrupted.

As a check on the time-keeping integrity of RTC 22, processor 34 examines the contents of these memory locations every time the board powers up. If the pattern in RTC 22 does not match the expected pattern, then a power failure has been detected. Or, in other words, if the expected pattern is seen, it may be assumed that RTC 22 has not lost power and its data has not been corrupted. The firmware is capable of recording this condition in memory device 36 and/or report the condition via call initiated over modem 32.

Figure 3:
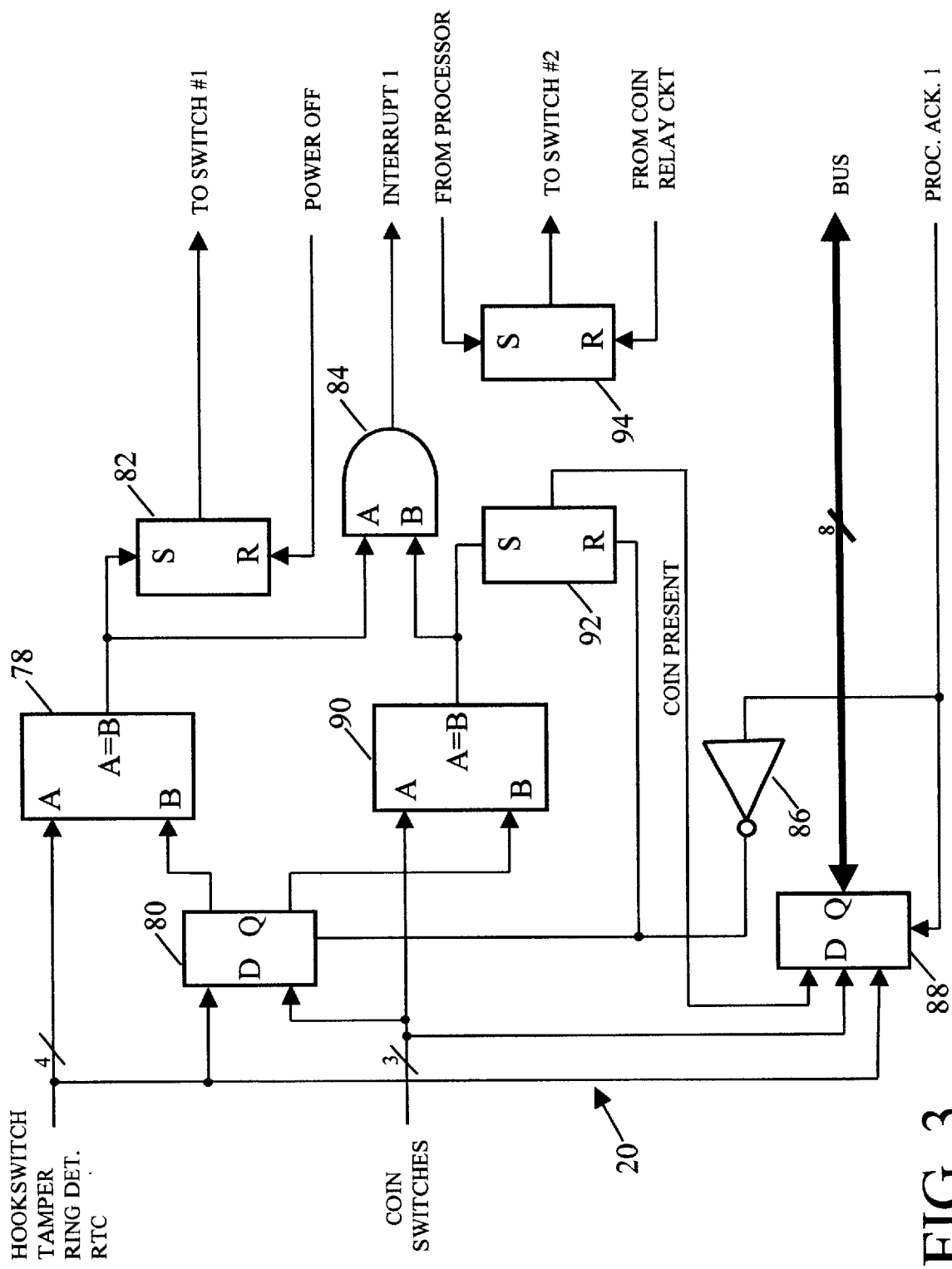
FIG. 3 is a schematic representation of the VDD control circuitry in the unit of FIG. 1.

A preferred arrangement of VDD control 20 will now be explained with reference to FIG. 3. As noted above, this circuitry monitors several input sources for a change in status. For example, the illustrated arrangement monitors hookswitch, tamper detect switch, coin switches (e.g., Quarter, Dime and Nickel), ring detector 16 and RTC 22. Preferably, the interrupt control logic components are continually powered in a static state until a change in input is detected, thereby consuming an insignificant amount of current.

An interrupt to processor 34 is generated with any change in state of the predetermined inputs. Although the hookswitch is often the only input which needs to generate an interrupt on both transitions, interrupts may nevertheless be generated on both transitions of all control inputs. Upon receiving an interrupt from VDD control 20, processor 34 will service the interrupt and determine its source.

In the illustrated embodiment, VDD control 20 is divided into three sections. The first section receives inputs from the hookswitch, tamper detect switch, ring detector 16 and RTC 22. For all inputs but RTC 22, this section operates to close switch 40 and take the board off-hook. RTC 22 can generate an alarm whether the board is in the on-hook or off-hook condition. If the board is on-hook, however, the clock alarm will initiate power-up using energy stored in the coin capacitor.

The second section monitors the coin switches. This section does not turn power on, but stores information that a coin has been registered. The third section controls the charging of coin capacitor 52 through switch 44.

The operation of the first interrupt section will now be described assuming an initial off-hook condition. A four-bit magnitude comparator 78 receives inputs on its "A" side from the hookswitch, tamper detect switch, ring detector 16 and RTC 22. These same signals supply inputs to four bits of latch 80. The output from latch 80 supply inputs to the "B" side of comparator 78. When the A and B sides of comparator 78 are equal, the A=B output from comparator 78 is high. All other conditions result in a low. Thus, the output from comparator 78 will go low whenever any of the four interrupt signals changes state since A will no longer equal B.

A low output from comparator 78 sets latch 82, thereby turning on power to the board. In addition, a logic low signal on input A of gate 84 causes its output to go low. As a result, an interrupt signal (designated Interrupt 1) is sent to processor 34. Processor 34 acknowledges the interrupt signal by sending back a low acknowledgement signal. The acknowledgment signal is inverted by inverter 86, sending a positive going clock signal to latch 80. With the new contents of latch 80 now equal to the input signals, the A and B inputs to comparator 78 will be equal, causing its output to return high.

While the acknowledgement signal is being sent, the input signals are allowed onto the data bus through buffer 88. Processor 34 can then determine which input signal changed and generated the interrupt. The four signals that can cause an interrupt are long duration signals. However, even if an input signal could change states and return to its original state before processor 34 could power-up and respond, no change of state would be recognized and the unit would power back down.

The second section of VDD control 20 is used to detect the presence of deposited coins. The interrupt circuitry for this section uses comparator 90, which operates identically to comparator 78. However, because there is the possibility that a coin could be deposited prior to processor 34 powering up and being able to detect such an interrupt, latch 92 is used as a coin latch. When the A=B output of comparator 90 goes low, thus indicating that a coin switch has changed states, latch 92 is set. Latch 92 thus remembers that a coin has been deposited prior to processor 34 being able to detect it. This could result, for example, from a user dropping a coin prior to hearing the dial tone and before processor 34 has come out of reset.

The low output of comparator 90 also furnishes the B input to gate 84. The output of gate 84 responsively goes low, sending an interrupt signal to processor 34. It can be seen that the output of latch 92 is an eighth bit supplied to buffer 88. If processor 34 detects this signal in the absence of a coin signal, it "knows" that it missed at least one deposited coin and will initiate a refund action. Thus, the coin present bit must be set whenever one of the three coin bits is present. When processor 34 returns an acknowledgement signal, latch 92 is cleared on the rising edge. This electronic coin present detector is equivalent to the mechanical "flapper" found on some types of coin relays to mechanically sense when coins have been deposited.

The third section of VDD control circuitry 20 is operationally separate from the other two. In the preferred embodiment, this section includes a single latch 94 used to control switch 42. In particular, latch 94 is set by a signal from processor 34 indicating that capacitor 52 is to be charged. This causes the output of latch 94 to go low, closing switch 42. Latch 94 is reset by a signal from the coin relay circuit as shown.

Figure 4:
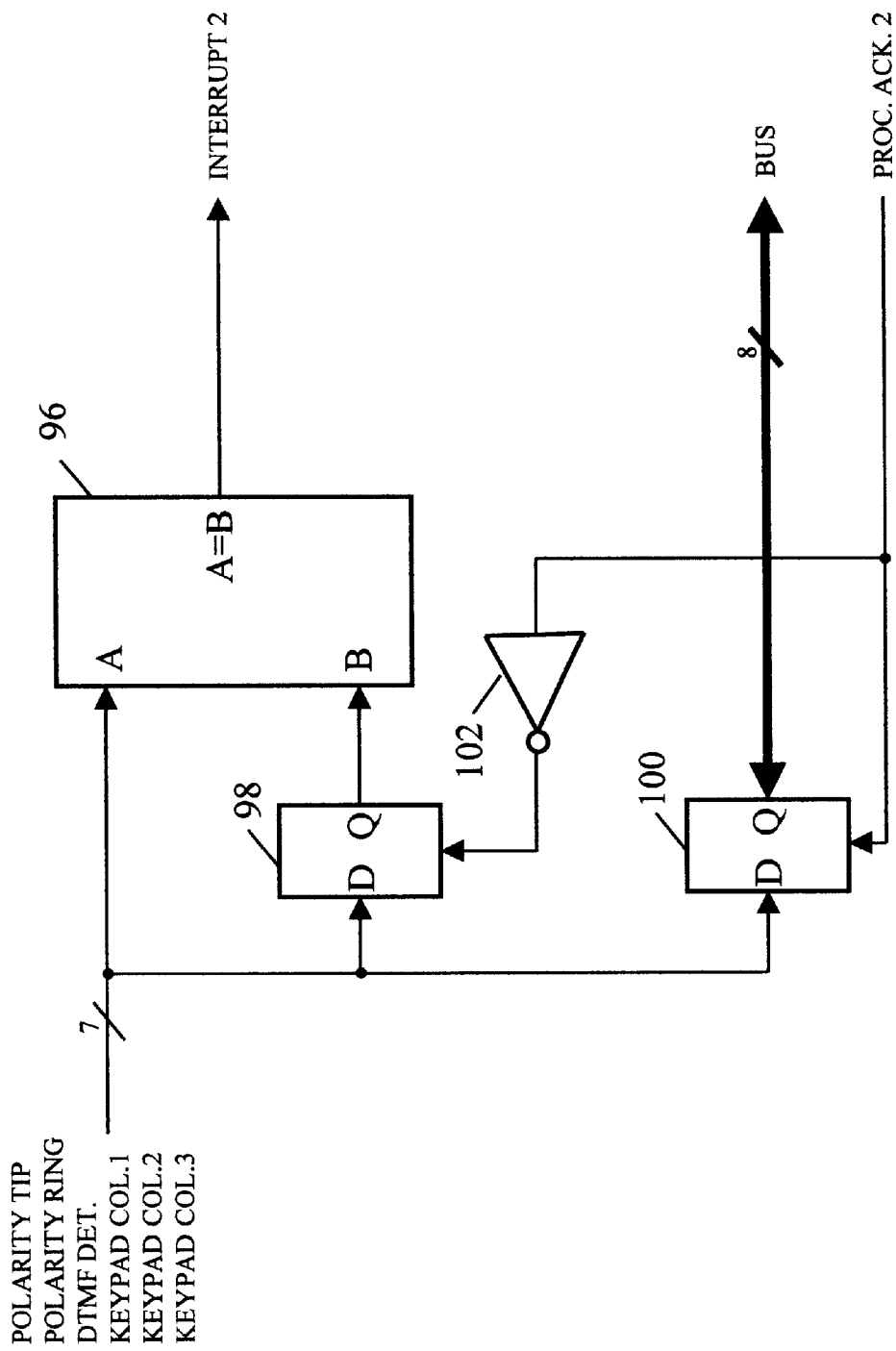
FIG. 4 is a schematic representation of the function control circuitry in the unit of FIG. 1.

Referring now to FIG. 4, a preferred configuration of function control circuitry 38 will be described. As can be seen, function control circuitry receives inputs from a number of sources for generating an interrupt to processor 34. In particular, inputs may be received from polarity tip, polarity ring, DTMF detector 28, and the three columns of the telephone keypad. A spare input may also be provided. A change in state of any of these inputs on either transition generates an interrupt to processor 34. Upon receiving an interrupt from function control circuitry 38, processor 34 will service the interrupt and determine its source.

In many respects, operation of function control circuitry 38 is similar to VDD control 20. In this case, however, a separate interrupt signal (designated Interrupt 2) is furnished to processor 34 to indicate that the interrupt originated from this circuitry. As shown, a comparator 96 receives the various inputs on the "A" side of its input. These same signals supply inputs to seven bits of latch 98 and buffer 100.

When the "A" and "B" inputs to comparator 96 are equal, its output is high. Other conditions result in a low. Whenever any of the inputs change state, "A" is no longer equal to the latched value on "B" and the output from comparator 96 goes low. As a result, the Interrupt 2 signal is sent to processor 34.

When processor 34 receives the interrupt, it sends back a low acknowledgement signal. The acknowledgement signal is inverted at inverter 102, supplying a positive-going clock signal to latch 98. With the new contents of latch 98 now equal to the input signals, the A and B inputs to comparator 96 will be equal, causing its output to return high. When the signal on the acknowledge line is low, the input signals are allowed onto the bus through buffer 100. Processor 34 can then determine which signal changed and generated the interrupt.

Figure 5:
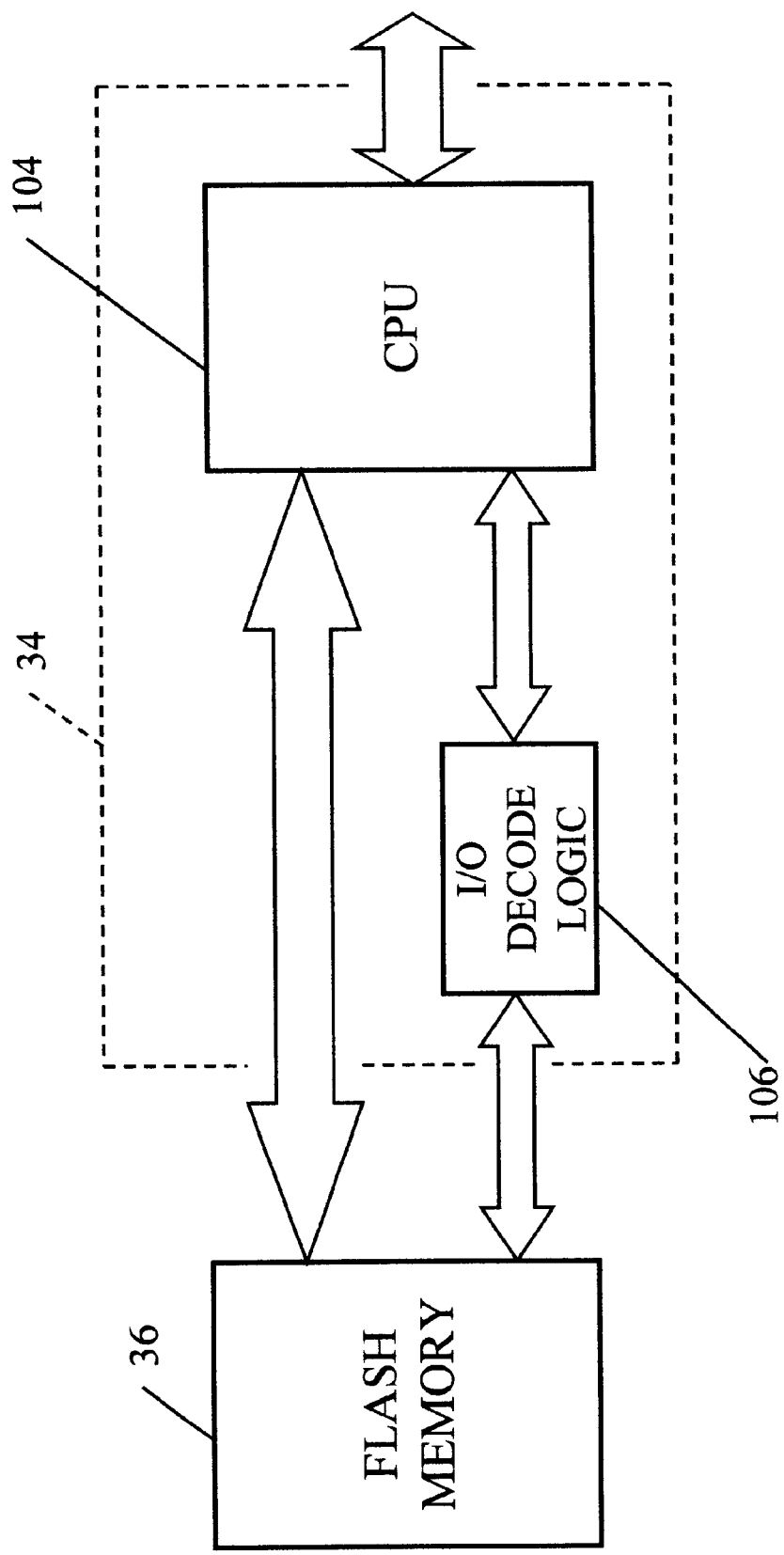
FIG. 5 is a diagrammatic representation of the processor and flash memory device in the unit of FIG. 1.

As shown in FIG. 5, the processor 34 will typically include a central processing unit (CPU) 104 and input/output (I/O) decode logic 106. A single flash memory device 36, a four megabit memory in exemplary embodiments, is used for the retention of all data. Information stored in memory device 36 may include program code, rate information, usage records, user programmable variables and speech files. Aside from a small amount of EEPROM and RAM that may be built into processor 34, and a few bytes of RAM contained within RTC 22, preferred embodiments use no additional discrete storage devices.

Being a nonvolatile device, data is retained in flash memory device 36 even when power is removed. In fact, as one skilled in the art will appreciate, accidental erasure or corruption of data contained in a flash memory device is very difficult.

For various reasons, flash memory device 36 is preferably soldered directly onto the circuit board instead of being positioned using a chip socket. Programming of any or all of the device may be accomplished via modem 32, or direct, high-speed serial communications. A separate interface port may be provided for downloading or uploading information with a direct computer connection.

The use of a flash memory device has often been viewed as unsuitable in applications where the data will be repeatedly "written over." In this case, for example, memory locations containing usage records, coin boxes totals and the like are frequently updated. To prevent excessive "writes" to a particular location, a block of memory is provided for such records. Processor 34 looks for the next available locations to store the updated record, instead of merely erasing and updating the same locations over and over. Once the last location in the block has been reached, the entire block is erased for reuse.

It will be appreciated that the use of a nonvolatile memory is necessary where no source of back-up power is provided. However, in a conventional scanning, or polling, architecture, such a memory may draw an unacceptably high level of current. The most important factor in reducing the overall current requirements in exemplary embodiments of the present invention is the interrupt-based architecture described above. With this configuration, the control logic, processor, memory and other support circuitry are kept in an idle state where possible. The reduction in current requirements achieved in this manner may translate directly into the range of loop characteristics over which the telephone unit will reliably operate. An additional advantage of using an interrupt structure is that no electrical activity is generated during the great majority of the telephone's operation, which could possibly be heard as noise in the handset.

Because many interrupt sources are preferably processed in the present invention, the microprocessor is only brought to full power when (1) a change in input status requires system processing (i.e., coin deposited, button pressed, etc.), or (2) when an internal microprocessor resource requests it for performing system functions. During the normal course of a call, situation (2) may occur, for example, every 0.5 second. If no inputs change, then the code runs every 0.5 seconds and may take only about eighty-five microseconds in many exemplary embodiments. This means that the microprocessor is in the full power mode only 0.017% of the time. This time is negligible, and the microprocessor could be considered to be in the low power mode essentially all of the time if this was the only interrupt source.

Determining the system load during situation (1) is generally more difficult since it can occur a variable number of times and at varying intervals. System analysis has shown, however, that during worst case loading, the microprocessor is in its full-power mode only approximately 10% of the time, and in its idle, low power mode, about 90% of the time. Since the microprocessor in preferred embodiments consumes about 8.6 ma in the full power mode and 3.0 ma in the low power mode, the worse case average is about 3.6 ma. The effect of this architecture on power consumption is great in comparison with polling architectures that remain active a much higher percentage of the time.

Preferred embodiments of the present invention utilize their interrupt structure and low power mode to a further advantage. When in the full power mode, a microprocessor must fetch its instructions from an external memory device. This external memory device must also be powered when the microprocessor is fetching instructions and executing a program. Depending on the microprocessor used, the external memory may still be powered, however, even when the microprocessor is in its own lower power mode.

In contrast, the decode logic of the telephone unit disclosed herein is preferably designed to specifically minimize this current consumption. When the microprocessor is in its low power mode, external flash memory is not accessed. Thereby, the flash memory's internal standby mode is activated. In preferred embodiments, current consumption drops from approximately 2.5 ma to about 20 microamperes, a reduction factor of 125:1.

As noted above, the low current consumption of the disclosed telephone unit allows use of a visual indicator of off-hook status. As an additional advantage, the efficiency of the design permits firmware based speech synthesis. In particular, the microprocessor may implement digital signal processing (DSP) techniques to decode adaptive differential pulse code modulation (ADPCM) speech files stored in the flash memory. The speech files are accessed by a look-up table in the microprocessor and converted back to analog speech with speech DAC 30, which may, for example, be a 12-bit DAC. The output from speech DAC 30 is preferably filtered before being routed to the earpiece or being output to the telephone line.

It will be appreciated that use of the microprocessor to decode the stored speech data may achieve reductions in components, board area and cost. This is in contrast to other telephones that have internal speech capabilities (either synthesized phrases or playback of recorded voice), and that generally use a speech playback chip designed for the purpose of decoding compressed digital audio to reproduce speech. In some cases, a separate memory device such as an EPROM is also used to store digital representations of the speech vocabulary. In these designs, the speech devices must also be powered at the same time that the microprocessor is already powered, thus increasing current draw and reducing power efficiency. In preferred embodiments of the present invention, the already-powered microprocessor is used to decode the compressed digital speech files contained in the flash memory.

An additional advantage of preferred embodiments of the present invention resides in the techniques utilized for audio tone detection and answer supervision. In particular, some prior art designs pass received audio through a high pass filter to reject 60 Hz noise from AC power. The resulting signal is then passed through a zero-crossing detector where the zero-crossings are counted to identify the nature of the audio signals.

In the disclosed telephone unit, hardware high-pass filtering can be eliminated by accomplishing the "filtering" function in the firmware. Specifically, the time interval between zero-crossings can be measured in addition to counting the zero-crossings themselves. By performing this timing analysis, both high-pass and low-pass filters can be implemented. Undesired zero-crossings, such as those caused by 60 Hz line power, digital noise, and other spurious signals, can be ignored.

Figure 6:
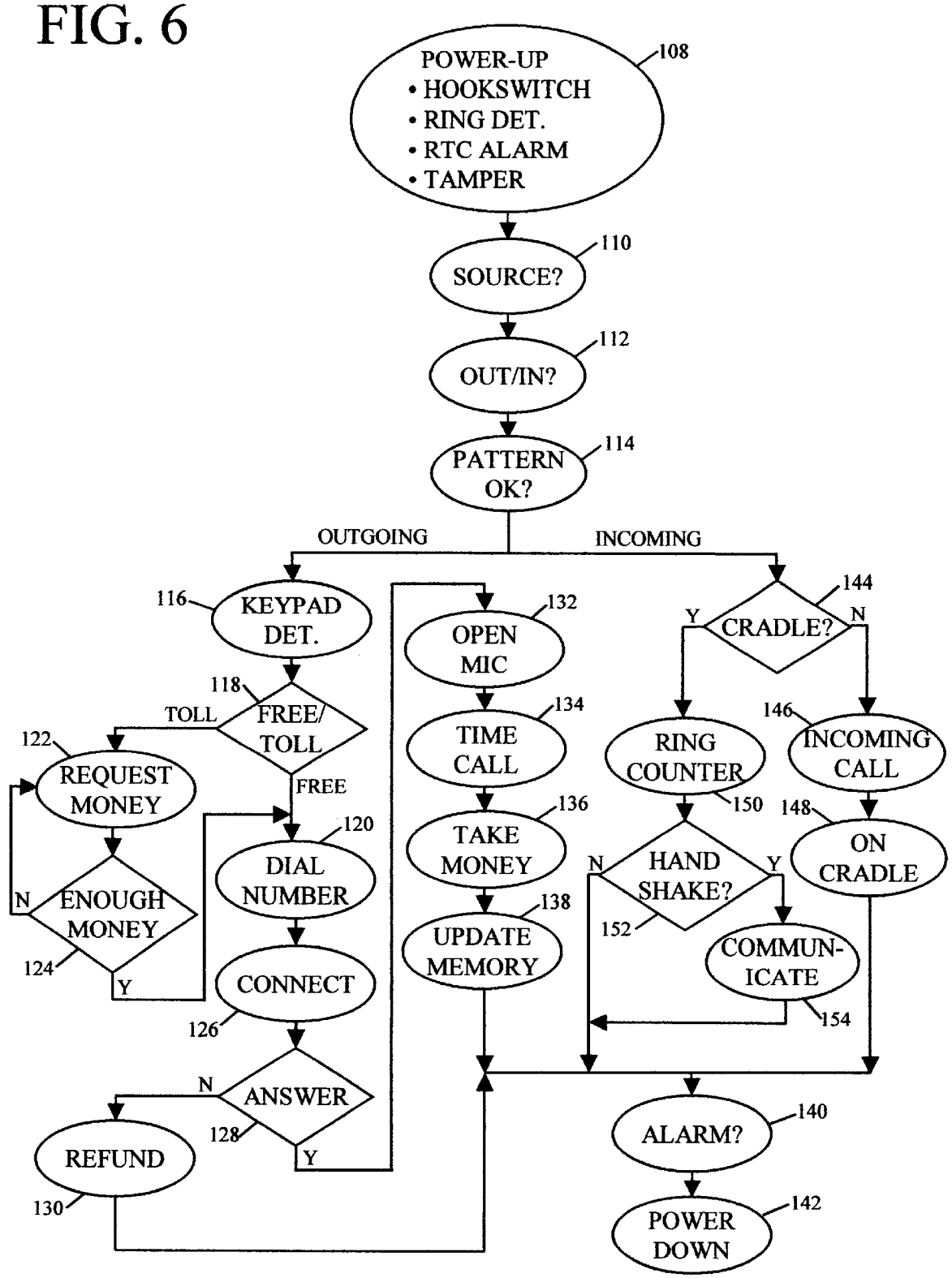
FIG. 6 is a flow diagram showing operative aspects of the unit of FIG. 1.

FIG. 6 is a flowchart showing, in a general sense, operation of the telephone unit illustrated in the preceding drawings. Initially, the unit is powered down except for the few continually-powered components as described above. When one of the proper predetermined inputs is received, the unit powers up as indicated at 108. Processor 34 then determines the source of the interrupt event, as indicated at 110, and notes whether a call is outgoing or incoming as shown at 112. Next, as indicated at 114, processor 34 determines whether the clock pattern is corrupted, thereby indicating that RTC 22 was deprived of power in the intervening period since the last power-up.

If the call is an outgoing voice call, processor 34 reads the keypad output, as indicated at 116, to determine the number to be dialed. As shown at 118, processor 34 then ascertains whether the call is free or toll. If the call is free, processor 34 dials the number input by the user, as indicated at 120. If the call is toll, the appropriate amount of money is requested, as shown at 122. As indicated at 124, the processor checks the money total until the correct amount has been deposited.

After the number has been dialed, connection to the destination is confirmed, as shown at 126. At this point, as shown at 128, processor 34 can determine whether an answer or no-answer has occurred. A no-answer initiates a refund, as indicated at 130. An answer opens the telephone's microphone, as indicated at 132, to allow communication by the user.

The call is timed, as shown at 134, for toll or general record-keeping purposes. After the call is completed, the coin relay is activated as shown at 136 to take the deposited coinage. The telephone unit then updates the usage records of flash memory device 36, as shown at 138. Finally, as shown at 140, a determination is made regarding whether an alarm condition exists. If no alarm condition exists, the unit powers down again as shown at 142.

Like outgoing calls, an incoming call may be either voice or data. Therefore, an initial determination is made at 144 regarding whether the handset is on or off of the hookswitch cradle. If the handset is off-cradle, an incoming voice call is assumed. After the call is conducted by the user, as shown at 146, the user will typically hang the handset back on the cradle. Upon receipt of an on-cradle determination, as shown at 148, the unit can again be powered down.

If the handset is on-cradle, a ring counter within ring detector 16 will cause the call to be answered after a predetermined number of rings, as indicated at 150. The modem then attempts a predetermined handshake protocol with the incoming call, as shown at 152. As indicated at 154, successful handshake will result in electronic communication between the calling computer and processor 34. After such communication, or if successful handshake cannot be established, the unit will hang up. After hang up, the unit powers down until further activity.

It can thus be seen that the present invention provides an improved line-powered telephone that does not require the use of backup batteries. While preferred embodiments of the invention have been shown and described, modifications and variations may be made thereto by those of ordinary skill in the art without departing from the spirit and scope of the present invention, which is more particularly set forth in the appended claims. In addition, it should be understood that various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A pay telephone unit for connection to a telephone line, said telephone unit comprising:
    a microprocessor;
    a nonvolatile memory device associated with said microprocessor;
    said memory device operative to receive and store usage information output from said microprocessor, as well as being operative to store therein program code and rate information;
    said memory device maintaining memory contents during on-hook condition without application of power thereto;
    power control circuitry operative to initiate power up of said microprocessor responsive to predetermined inputs;
    power routing circuitry operatively associated with said power control circuit to direct power from said telephone line to said microprocessor only in response to said predetermined inputs; and
    a real time clock device, said power routing circuitry further operative to direct power from said telephone line to said real time clock device irrespective of said predetermined inputs such that said real time clock device will directly receive all of its power from the telephone line in both off-hook and on-hook conditions.

2. A pay telephone unit as set forth in claim 1, wherein said nonvolatile memory device is a flash memory unit.

3. A pay telephone unit as set forth in claim 2, wherein said flash memory unit is mounted directly to a printed circuit board.

4. A pay telephone unit as set forth in claim 2, wherein said flash memory device further has stored therein compressed speech information operatively decoded by a speech decode algorithm implemented by said microprocessor.

5. A pay telephone unit for connection to a telephone line, said telephone unit comprising:
    a microprocessor;
    a nonvolatile memory device associated with said microprocessor, said memory device having at least program code and rate information stored therein;
    power control circuitry operative to initiate power up of said microprocessor responsive to predetermined inputs;
    power routing circuitry operatively associated with said power control circuit to direct power from said telephone line to said microprocessor only in response to said predetermined inputs; and
    a real time clock device, said power routing circuitry further operative to direct power from said telephone line to said real time clock device irrespective of said predetermined inputs such that said real time clock device will directly receive all of its operating power from the telephone line in both off-hook and on-hook conditions.

6. A pay telephone unit as set forth in claim 5, wherein said microprocessor is operative to interrogate said real time clock device after power up to determine if an intervening data corruption has occurred.

7. A pay telephone unit as set forth in claim 5, wherein said power routing circuitry further comprises a passive energy storage element operative to maintain operation of said real time clock device for a predetermined period of time during interruptions in power from said telephone line.

8. A pay telephone unit as set forth in claim 7, wherein said passive energy storage element is a capacitive element associated with a coin relay.

9. A pay telephone unit as set forth in claim 5, wherein said power routing circuitry further comprises a passive energy storage element operative to power up said microprocessor responsive to an alarm indicator from said real time clock device when in said on-hook condition.

10. A pay telephone unit as set forth in claim 5, wherein said power routing circuitry includes at least one resistive element bypassed in said off-hook condition such that a predetermined higher resistance is presented to said telephone line in said on-hook condition than said off-hook condition.

11. A pay telephone unit as set forth in claim 10, wherein said predetermined higher resistance is at least five megohms.

12. A pay telephone unit as set forth in claim 10, wherein said power control circuitry includes a first buffer operative to store data indicative of said predetermined inputs, said microprocessor being further operative to communicate with said first buffer.

13. A pay telephone unit as set forth in claim 12, wherein said power control circuitry further includes coin present circuitry operative to indicate to said microprocessor deposition of coinage occurring prior to power up thereof.

14. A pay telephone unit as set forth in claim 12, further comprising function control circuitry operative to inform said microprocessor of predetermined functions and having a second buffer to store data indicative thereof, said microprocessor being further operative to communicate with said second buffer.

15. A pay telephone unit for connection to a telephone line, said telephone unit comprising:
    a microprocessor;
    a flash memory device associated with said microprocessor;
    a real time clock device;
    power control circuitry operative to initiate power up of said microprocessor responsive to at least a hookswitch mechanism indicating an off-hook condition; and
    power routing circuitry operatively associated with said power control circuitry to direct power from said telephone line to said microprocessor in response to said off-hook condition, said power routing circuitry further operative to direct power from said telephone line to said real time clock device irrespective of said off-hook condition such that said real time clock device will directly receive all of its operating power from the telephone line in both off-hook and on-hook conditions without application of supplemental power thereto.

16. A pay telephone unit as set forth in claim 15, wherein said power routing circuitry further comprises a capacitive element operative to power up said microprocessor responsive to an alarm indicator from said real time clock device when in said on-hook condition.

17. A pay telephone unit as set forth in claim 15, wherein said power routing circuitry further comprises a capacitive element operative to maintain operation of said real time clock device for a predetermined period of time during interruptions in power from said telephone line.

18. A pay telephone unit as set forth in claim 15, wherein said power routing circuitry includes at least one resistive element to present a predetermined resistance to said telephone line when in said on-hook condition.

19. A pay telephone unit as set forth in claim 18, wherein said predetermined resistance is at least five megohms.

20. A pay telephone unit as set forth in claim 15, wherein said microprocessor writes usage records to said flash memory device for storage therein.

21. A pay telephone unit as set forth in claim 20, wherein said microprocessor will be in one of a no power condition, low power condition or full power condition at predetermined times.

22. A pay telephone unit for connection to a telephone line, said telephone unit comprising;
- a microprocessor;
- a real time clock device;
- a flash memory device associated with said microprocessor for storing program code, rate information and usage records;
- power control circuitry operative to initiate power up of said microprocessor responsive to predetermined inputs;
- power routing circuitry operatively associated with said power control circuitry to direct power from said telephone line to said microprocessor only in response to said predetermined inputs, said power routing circuitry further operative to direct power from said telephone line to said real time clock device irrespective of said predetermined inputs; and
- whereby said telephone unit is operative to derive all of its operating power from said telephone line without use of batteries.

23. A pay telephone unit as set forth in claim 22, wherein said power routing circuitry presents a resistance of at least five megohms to said telephone line in an on-hook condition.

24. A pay telephone unit as set forth in claim 23, wherein said power routing circuitry further comprises a passive energy storage element operative to provide a reservoir of energy usable during predetermined situations while in an on-hook condition.

25. A pay telephone unit as set forth in claim 24, wherein said passive energy storage element is a capacitive element associated with a coin relay.

26. A pay telephone unit as set forth in claim 25, wherein said power control circuitry includes a first buffer operative to store data indicative of said predetermined inputs, said microprocessor being further operative to communicate with said first buffer.

27. A pay telephone unit as set forth in claim 26, wherein said power control circuitry further includes coin present circuitry operative to indicate to said microprocessor deposition of coinage during an on-hook condition.

28. A pay telephone unit as set forth in claim 27, further comprising function control circuitry operative to inform said microprocessor of predetermined functions and having a second buffer to store data indicative thereof, said microprocessor being further operative to communicate with said second buffer.

29. A pay telephone unit as set forth in claim 25, wherein said flash memory device is configured for on-board programming.

30. A pay telephone unit as set forth in claim 25, further comprising a modem device operative to effect electronic communication with said microprocessor via said telephone line.

31. A pay telephone unit as set forth in claim 25, further comprising a light-emitting diode operative to give a visual indication of an off-hook condition.

32. A pay telephone unit as set forth in claim 25, wherein said microprocessor is configured to perform digital highpass and lowpass filtering of received audio signals.

* * * * *